US009657740B2

(12) United States Patent
Mauchle et al.

(10) Patent No.: US 9,657,740 B2
(45) Date of Patent: May 23, 2017

(54) POWDER SUPPLYING DEVICE FOR A POWDER COATING INSTALLATION

(75) Inventors: Felix Mauchle, Abtwil (CH); Norbert Honegger, Abtwil (CH); Mark Steinemann, Elgg (CH); Hanspeter Michael, Gossau (CH)

(73) Assignee: GEMA SWITZERLAND GMBH, St. Gallen (CH)

( * ) Notice: Subject to any disclaimer, the term of this patent is extended or adjusted under 35 U.S.C. 154(b) by 240 days.

(21) Appl. No.: 13/817,242

(22) PCT Filed: Aug. 17, 2011

(86) PCT No.: PCT/US2011/048022
§ 371 (c)(1),
(2), (4) Date: Apr. 25, 2013

(87) PCT Pub. No.: WO2012/024358
PCT Pub. Date: Feb. 23, 2012

(65) Prior Publication Data

US 2013/0209282 A1 Aug. 15, 2013

(30) Foreign Application Priority Data

Aug. 18, 2010 (DE) ........................ 10 2010 039 473

(51) Int. Cl.
*B65G 53/16* (2006.01)
*F04D 7/00* (2006.01)
*B05B 7/14* (2006.01)

(52) U.S. Cl.
CPC .............. *F04D 7/00* (2013.01); *B05B 7/1404* (2013.01); *B05B 7/1445* (2013.01); *B05B 7/1454* (2013.01)

(58) Field of Classification Search
CPC ............ B65G 53/16; B65G 53/42; F04D 7/00
(Continued)

(56) References Cited

U.S. PATENT DOCUMENTS 2,181,095 A * 11/1939 Ness ................................ 432/23
2,980,298 A * 4/1961 Hanson .......................... 406/135
(Continued)

FOREIGN PATENT DOCUMENTS

DE 4400457 A1 7/1995
DE 10145448 A1 5/2003
(Continued)

OTHER PUBLICATIONS

An International Search Report and Written Opinion corresponding to PCT/US2011/048022, dated Jul. 17, 2012.
(Continued)

*Primary Examiner* — Joseph Dillon, Jr.
(74) *Attorney, Agent, or Firm* — Kinney & Lange, P.A.

(57) ABSTRACT

The invention relates to a powder supplying device for a powder coating installation with at least one powder container, which has a powder chamber for coating powder, and with at least one powder injector, which is connected or can be connected to a powder discharge channel opening out via a powder discharge opening in the powder chamber, in order to suck coating powder out of the powder chamber in the powder coating operation of the powder coating installation with the aid of conveying compressed air fed by the powder injector. In order to make it possible for the powder to be changed quickly in an easy manner, it is provided according to the invention that the powder discharge channel has a reduced length of at most 300 mm, preferably a length of 160 mm to 240 mm and more preferably a length of 200 mm.

29 Claims, 3 Drawing Sheets

Figure 1:
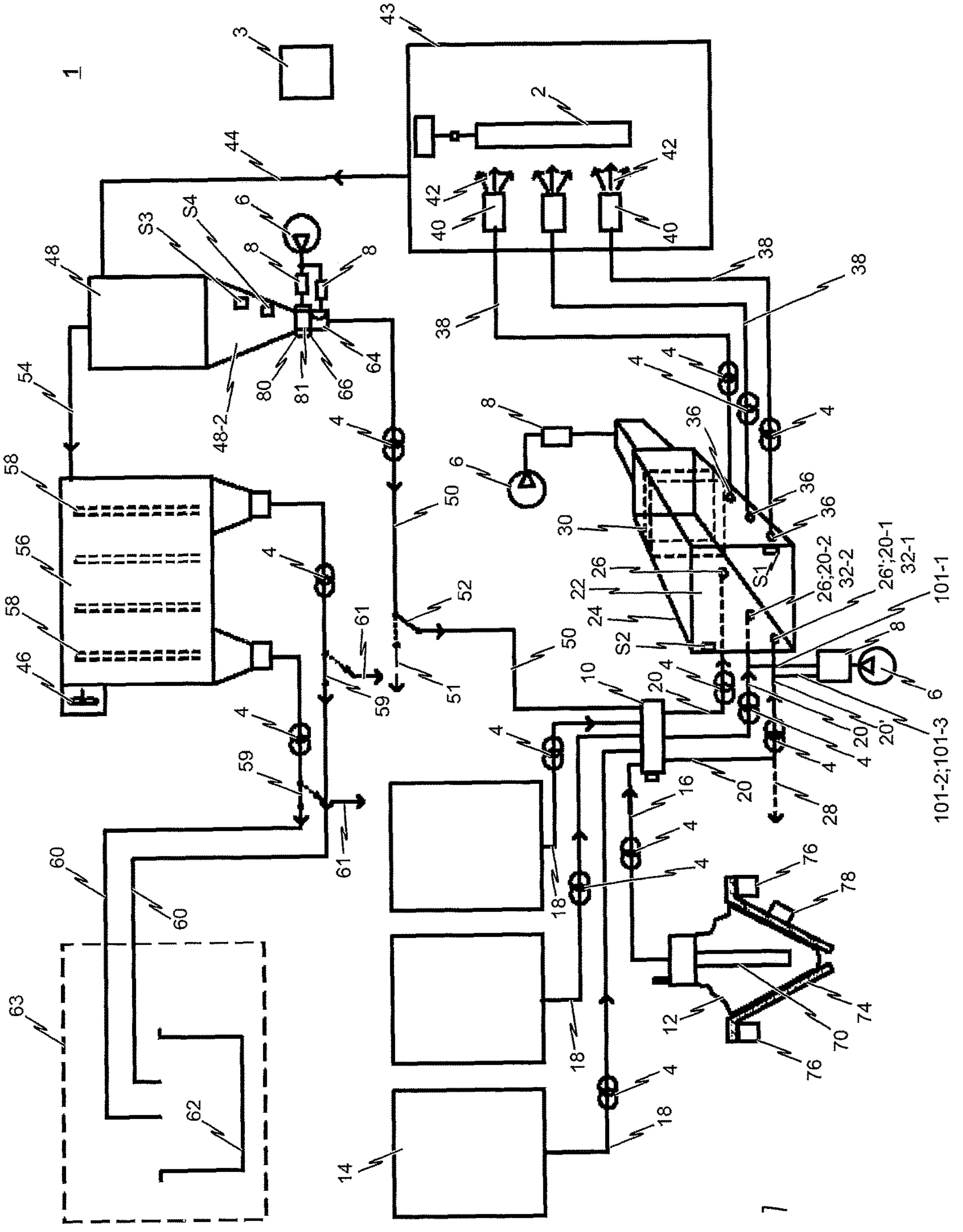

(58) Field of Classification Search
USPC .......... 406/141, 142, 143, 92, 151, 152, 153
See application file for complete search history.

(56) References Cited

U.S. PATENT DOCUMENTS

| | | | | | |
|---|---|---|---|---|---|
| 3,329,267 | A * | 7/1967 | Millhiser | 209/210 |
| 3,797,747 | A * | 3/1974 | Buzzi et al. | 239/311 |
| 3,809,436 | A * | 5/1974 | Ciaffone | 406/48 |
| 3,858,763 | A * | 1/1975 | Mack | 406/133 |
| 3,870,375 | A * | 3/1975 | Duncan et al. | 406/127 |
| 3,933,394 | A * | 1/1976 | Klein et al. | 406/90 |
| 3,960,323 | A * | 6/1976 | Ducan et al. | 239/3 |
| 4,016,994 | A * | 4/1977 | Wurster | 406/39 |
| 4,116,367 | A * | 9/1978 | Kataoka et al. | 222/144.5 |
| 4,381,897 | A * | 5/1983 | Arbeletche et al. | 406/93 |
| 4,586,854 | A * | 5/1986 | Newman et al. | 406/153 |
| 4,615,649 | A * | 10/1986 | Sharpless | 406/138 |
| 4,730,647 | A * | 3/1988 | Mulder | 141/67 |
| 4,807,814 | A | 2/1989 | Douche et al. | |
| 4,824,295 | A * | 4/1989 | Sharpless | 406/109 |
| 4,834,544 | A * | 5/1989 | Paul | 366/101 |
| 4,892,463 | A * | 1/1990 | Meyer et al. | 417/151 |
| 4,900,200 | A * | 2/1990 | Harumoto et al. | 406/93 |
| 5,006,019 | A * | 4/1991 | Dziedzic et al. | 406/152 |
| 5,024,561 | A * | 6/1991 | Kitagawa | 406/173 |
| 5,131,350 | A * | 7/1992 | Buschor | 118/308 |
| 5,226,567 | A * | 7/1993 | Sansalone | 222/195 |
| 5,238,154 | A * | 8/1993 | Zuriel | 222/189.06 |
| 5,378,089 | A * | 1/1995 | Law | 406/123 |
| 5,454,256 | A * | 10/1995 | Gimben et al. | 73/29.01 |
| 5,615,832 | A * | 4/1997 | Price | 239/8 |
| 5,615,980 | A * | 4/1997 | Mauchle | 406/19 |
| 5,971,207 | A | 10/1999 | McDonough et al. | |
| 6,024,304 | A * | 2/2000 | Sawada | 239/654 |
| 6,129,946 | A * | 10/2000 | Adams | 427/8 |
| 6,223,997 | B1 * | 5/2001 | Fulkerson et al. | 239/112 |
| 6,227,462 | B1 * | 5/2001 | Chen | 239/284.1 |
| 6,257,804 | B1 * | 7/2001 | Gathmann | 406/68 |
| 6,508,610 | B2 * | 1/2003 | Dietrich | 406/13 |
| 6,598,803 | B1 * | 7/2003 | Haas et al. | 239/67 |
| 6,840,463 | B2 * | 1/2005 | Selic | 239/431 |
| 7,163,359 | B2 | 1/2007 | Moser | |
| 7,168,635 | B2 * | 1/2007 | Amaduzzi | 239/318 |
| 7,311,474 | B1 * | 12/2007 | Ogasahara et al. | 406/143 |
| 7,717,354 | B1 * | 5/2010 | Robinson | 239/1 |
| 7,971,551 | B2 * | 7/2011 | Mauchle et al. | 118/308 |
| 8,444,351 | B2 * | 5/2013 | Volonte et al. | 406/24 |
| 8,685,237 | B2 * | 4/2014 | Littman et al. | 210/153 |
| 2001/0003568 | A1 | 6/2001 | Dietrich | |
| 2001/0050049 | A1 * | 12/2001 | Kramer et al. | 118/638 |
| 2002/0092468 | A1 * | 7/2002 | Mauchle et al. | 118/309 |
| 2003/0190200 | A1 | 10/2003 | Hajima et al. | |
| 2004/0101620 | A1 * | 5/2004 | Elmoursi et al. | 427/180 |
| 2005/0028867 | A1 * | 2/2005 | Ciarelli et al. | 137/240 |
| 2006/0193704 | A1 | 8/2006 | Simontacchi | |
| 2007/0163493 | A1 * | 7/2007 | Lacchia | 118/300 |
| 2008/0184793 | A1 * | 8/2008 | Mauchle et al. | 73/290 R |
| 2008/0187423 | A1 * | 8/2008 | Mauchle et al. | 414/415 |
| 2008/0187658 | A1 * | 8/2008 | Mauchle et al. | 427/180 |
| 2009/0293357 | A1 * | 12/2009 | Vickers et al. | 47/62 A |
| 2010/0028090 | A1 | 2/2010 | Mauchle et al. | |
| 2010/0071616 | A1 * | 3/2010 | Mauchle et al. | 118/308 |
| 2011/0076159 | A1 | 3/2011 | Fulkerson et al. | |
| 2012/0322915 | A1 * | 12/2012 | Sumiyoshi et al. | 523/400 |
| 2013/0108379 | A1 * | 5/2013 | Mauchle et al. | 406/110 |
| 2014/0048015 | A1 * | 2/2014 | Mauchle et al. | 118/600 |
| 2014/0366958 | A1 * | 12/2014 | Miyazaki et al. | 137/240 |

FOREIGN PATENT DOCUMENTS

| | | | |
|---|---|---|---|
| DE | 10353968 | A1 | 7/2005 |
| DE | 102007005306 | A1 | 8/2008 |
| EP | 1331183 | A1 | 7/2003 |
| JP | 61181559 | A | 8/1986 |
| JP | 08175665 | A | 7/1996 |
| JP | 10323583 | A | 12/1998 |
| JP | 2002096930 | A | 4/2002 |
| JP | 2010017628 | A | 1/2010 |
| WO | 2005051549 | A1 | 6/2005 |

OTHER PUBLICATIONS

Notice of Reasons for Rejection for JP2013-524947 mailed Aug. 12, 2014.

* cited by examiner

POWDER SUPPLYING DEVICE FOR A POWDER COATING INSTALLATION

RELATED APPLICATIONS

The present application is a National Phase of International Application Number PCT/US2011/048022, filed Aug. 17, 2011, and claims priority from German Application Number 102010039473.4, filed Aug. 18, 2010.

Accordingly, the invention relates in particular to a powder supplying device for a powder coating installation, wherein the powder supplying device has at least one powder container with a preferably cuboidal powder chamber for coating powder, and at least one powder injector, wherein the at least one powder injector is connected or can be connected to a powder discharge channel which opens out via a powder discharge opening in the powder chamber. The at least one powder injector here is designed in order to suck coating powder out of the powder chamber in the powder coating operation of the powder coating installation with the aid of conveying compressed air fed by the powder injector.

The device according to the invention is suitable in particular for supplying powder to a powder coating installation which is used for the electrostatic spray coating of objects with powder and in which fresh coating powder (also called “fresh powder” below) and optionally recovered coating powder (also called “recovery powder” below) are located in the powder container and are fed to a spraying device by a powder discharge device, for example in the form of a powder injector. The spraying device may be, for example, a handgun or an automatic gun.

The powder discharge device, which is also referred to below as the powder injector, conveys the coating powder out of the powder container with the aid of conveying compressed air. In the process, the mixture of conveying compressed air and powder flows in the interior of the powder injector through a powder channel of a receiving nozzle, wherein metering air is additionally added to the powder conveying-air mixture with the aid of the receiving nozzle in order to achieve a defined total air stream.

Fresh powder is fed as and when required to the powder container via a fresh powder line from a supplier’s container in which the powder supplier supplies the fresh powder to the powder user.

The powder forms a compact mass in the supplier’s container. By contrast, the coating powder should be in a fluidized state in the powder container so that it can be extracted, for example, by the suction effect of a powder injector and fed in a compressed-air stream to the spraying device. A powder supplying device therefore contains in particular a powder container which serves as a powder chamber for storing coating powder, the coating powder customarily being fluidized in the powder container so that it can easily be conveyed pneumatically either to another powder container or to a powder spraying device. As already indicated, the powder spraying device may be a manual or an automatic powder spraying device which can have a spray nozzle or a rotary atomizer.

The problem addressed by the invention is that powder coating installations and the associated powder supplying devices have to be carefully cleaned when there is a change of powder (change from one type of powder to another type of powder), in particular when there is a change of color (change of powder of a first color to powder having a different, second color), since just a few powder particles of the earlier type of powder may result in coating errors when coating with the new type of powder.

The object of providing an option by means of which a change of powder is rapidly possible in a simple manner is intended to be achieved by the invention.

Advantageous developments of the powder supplying device according to the invention are specified in the dependent patent claims.

Accordingly, a powder supplying device for a powder coating installation is in particular proposed, wherein the powder supplying device has at least one powder container with a preferably cuboidal powder chamber for coating powder, and at least one powder discharge device, preferably in the form of a powder injector, wherein the powder discharge device is connected or can be connected to a powder discharge channel opening out via a powder discharge opening in the powder chamber, in order to suck coating powder out of the powder chamber in the powder coating operation of the powder coating installation. If a powder injector is used as the powder discharge device, the coating powder is sucked out of the powder chamber by regulated feeding of conveying compressed air to the powder injector. According to the invention, it is provided that the powder discharge channel, via which the powder discharge device (powder injector) is connected to the powder chamber, has a reduced length of at most 300 mm, preferably of 160 mm to 240 mm and more preferably of 200 mm.

In comparison to solutions known from the prior art, it is accordingly proposed that the powder injector be fluidically connected to the powder chamber via a relatively short powder discharge channel. With the same effective diameter of the powder discharge channel, by means of the consciously selected shortening of the powder discharge channel it is possible noticeably to reduce the pressure loss caused by the powder discharge channel, since the geodetic difference in pressure, which constitutes a portion of the total pressure loss, is reduced by the shortening of the powder discharge channel.

Since, in comparison to solutions known from the prior art, the flow resistance coefficient of the powder discharge channel is reduced while the diameter of the powder discharge channel is maintained, a smaller amount of conveying air fed to the powder injector per unit of time is required in the powder coating operation of the powder coating installation in order to suck a sufficient amount of coating powder out of the powder chamber. This leads to a saving of the total air (conveying and metering air) required as a whole in the powder coating operation of the powder coating installation and therefore to cost savings in the operation of the powder coating installation.

Furthermore, the reduction of the flow resistance coefficient of the powder discharge channel has the advantage in particular that, in the cleaning operation of the powder coating installation, in particular when there is a change of colour or powder, the compressed air fed via the conveying compressed-air connection of the at least one powder injector can be used both for purging the powder discharge channel and for purging the powder line connected to the at least one powder injector.

Of course, it would in principle be conceivable to increase the effective flow cross section of the powder discharge channel in order to reduce the flow resistance coefficient of the powder discharge channel. However, this would have the negative effect that the amount of conveying air to be fed to the at least one powder injector per unit of time in the powder coating operation of the powder coating installation would have to be increased in order to be able to suck a sufficient amount of coating powder out of the powder chamber. According to the teaching of the present invention, it is therefore consciously refrained from increasing the effective flow cross section of the powder discharge channel. On the contrary, it is preferred if the powder discharge channel has a diameter of approximately 10 mm, as is customary in solutions known from the prior art.

Surprisingly, it has even been found that effective purging of the powder discharge channel with compressed air fed via the conveying compressed-air connection of the at least one powder injector is possible in the cleaning operation of the powder coating installation even if the powder discharge channel has a diameter which lies within a range of between 3 mm and 10 mm, wherein a diameter of 8 mm to 5 mm is preferred within the scope of the invention.

As already indicated, it is preferred if the at least one powder discharge device, with which coating powder is sucked out of the powder chamber in a regulated manner in the powder coating operation of the powder coating installation, is designed in the form of a powder injector. The at least one powder injector preferably has a conveying compressed-air connection, which is connected or can be connected to a compressed air source, for the regulated feeding of conveying compressed air, and a metering compressed-air connection, which likewise is connected or can be connected to a compressed air source, or to the same compressed air source, for the regulated feeding of metering compressed air. In this embodiment, it is provided in particular that the conveying compressed air fed to the powder injector generates a negative pressure in a negative pressure region of the powder injector. Said negative pressure makes it possible for coating powder to be sucked out of the powder chamber via the powder discharge channel assigned to the powder injector.

A powder injector of this type may in principle have a construction known from the prior art, wherein it has in particular a conveying compressed-air connection, which is connected or can be connected to a compressed air source, for the regulated feeding of conveying compressed air, a metering air connection, which is connected or can be connected to a compressed air source, for the regulated feeding of metering air, and a Venturi nozzle and a receiving nozzle. In this case, the receiving nozzle of the powder injector is connected or can be connected to a powder line, in particular to a powder hose or the like, to convey the coating powder sucked out of the powder chamber with the aid of the powder injector to a spraying device.

In detail, in a preferred embodiment of the powder injector used in the solution according to the invention, compressed air is pressed through the Venturi nozzle into the receiving nozzle in a regulated manner via the conveying compressed-air connection of the powder injector. The small diameter of the Venturi nozzle ensures a high air speed, as a consequence of which, according to Bernoulli's law, a dynamic pressure drop is created. This negative pressure generated in the powder injector is used in order to suck coating powder out of the powder chamber via the powder discharge channel.

In this connection, it is preferred if the powder injector has a suction pipe connector, which is connected or can be connected to the powder discharge channel. The coating powder sucked up by the Venturi effect is mixed in the powder injector with the conveying compressed air and flows at high speed on through the receiving nozzle of the powder injector into the powder line (powder hose) connected to the powder injector, and finally to the spraying device, which may be, for example, a spray gun.

The amount of conveying compressed air fed to the at least one powder injector per unit of time in the powder coating operation of the powder coating installation influences the size of the powder cloud which can be achieved with the spraying device. By contrast, the amount of metering air fed to the at least one powder injector per unit of time via the metering air connection influences the speed at which the coating powder sucked out of the powder chamber is fed to the spraying device via the powder line.

Customarily, the powder line used is a powder hose which is connected releasably to the downstream end region of the receiving nozzle of the powder injector. Said powder hose, the inside diameter of which is customarily between 8 mm and 14 mm, generally has a length of up to 20 m. In the event of the device according to the invention being used in order to supply a spraying device with coating powder, said spraying device being connected to the powder injector via a customarily used powder hose of this type.

Since, in the case of the powder injector, the compressed air fed to the powder injector via the metering compressed-air connection does not make any contribution to the negative pressure which can be generated in the negative pressure region of the powder injector, but rather, on the contrary, serves to permit or assist the transport of the sucked-up coating powder to a receiving point, it is preferred according to the present invention if the metering compressed-air connection is provided downstream of the negative pressure region of the powder injector.

In a preferred realization of the embodiment referred to last, it is provided that the at least one powder injector has a Venturi nozzle, which is arranged and formed with respect to the powder injector in such a way that the conveying compressed air fed via the conveying compressed-air connection of the powder injector flows through the Venturi nozzle, so that a dynamic pressure drop is created in the region of the narrowest cross section of the Venturi nozzle to form the negative pressure region.

In particular, it is conceivable that the at least one powder injector has a preferably exchangeable receiving nozzle, which is arranged and formed downstream of the negative pressure region of the powder injector in order to form a powder outlet, and is connected or can be connected to a powder line, in particular to a powder hose, to convey the coating powder sucked out of the powder chamber with the aid of the powder injector to a receiving point, in particular to a spraying device.

In a preferred realization of the solution according to the invention, it is provided that the at least one powder injector furthermore has a cleaning compressed-air connection, which is connected or can be connected to a compressed air source, for the regulated feeding of cleaning compressed air in the cleaning operation of the powder coating installation. In this realization, it is furthermore preferred if the cleaning compressed-air connection is provided downstream of the negative pressure region of the powder injector. This is because the pressure ratios which can be realized in the powder injector can then be influenced in such a manner that even a positive pressure can be generated in the negative pressure region of the powder injector in order, in particular in the cleaning operation of the powder coating installation, the amount of compressed air supplied in total to the powder injector per unit of time at least partially as cleaning compressed air for cleaning/purging the powder discharge channel, which is connected to the negative pressure region of the powder injector.

In particular, it is conceivable, in the embodiment referred to last, for the cleaning compressed-air connection to be connected to the metering compressed-air connection via a branch, in particular a T piece. Of course, however, other solutions are also suitable here.

In a very particularly preferred realization of the invention, a manually actuable or automatically operating pressure regulating device is provided to regulate the amount of conveying compressed air fed to the conveying compressed-air connection per unit of time in the cleaning operation of the powder coating installation. Said pressure regulating device can furthermore be designed to regulate the amount of cleaning compressed air fed to the cleaning compressed-air connection per unit of time in the cleaning operation of the powder coating installation, and/or to regulate the amount of metering compressed air fed to the metering compressed-air connection per unit of time in the cleaning operation of the powder coating installation.

In this case, the pressure regulating device is preferably designed to set the amount of conveying compressed air fed to the conveying compressed-air connection per unit of time and/or the amount of cleaning compressed air fed to the cleaning compressed-air connection per unit of time and/or the amount of metering compressed air fed to the metering compressed-air connection per unit of time in the cleaning operation of the powder coating installation, in particular when there is a change of color or powder, in such a way that at least 20%, and preferably between 25 and 50%, of the compressed air fed in total per unit of time to the at least one powder injector flows as purging air through the powder discharge channel into the powder chamber, and that the rest of the compressed air fed in total per unit of time to the at least one powder injector flows as purging air through the powder line to the spraying device.

In a development of the embodiment referred to last, it is conceivable in particular that, with the aid of the pressure regulating device, the amount of compressed air fed in total to the powder injector in the cleaning operation of the powder coating installation is fed to the powder injector with a volume flow rate of at least 10 $m^3$/h to 17 $m^3$/h, the pressure regulating device also being designed to set the amount of conveying compressed air fed per unit of time to the conveying compressed-air connection and/or the amount of cleaning compressed air fed per unit of time to the cleaning compressed-air connection and/or the amount of metering compressed air fed per unit of time to the metering compressed-air connection in the cleaning operation of the powder coating installation in such a way that compressed air flows through the powder discharge channel with a volume flow rate of at least 3 $m^3$/h, and that compressed air flows through the powder line with a volume flow rate of at least 9 $m^3$/h.

An exemplary embodiment of the solution according to the invention is described below with reference to the attached drawings.

Figure 2A:
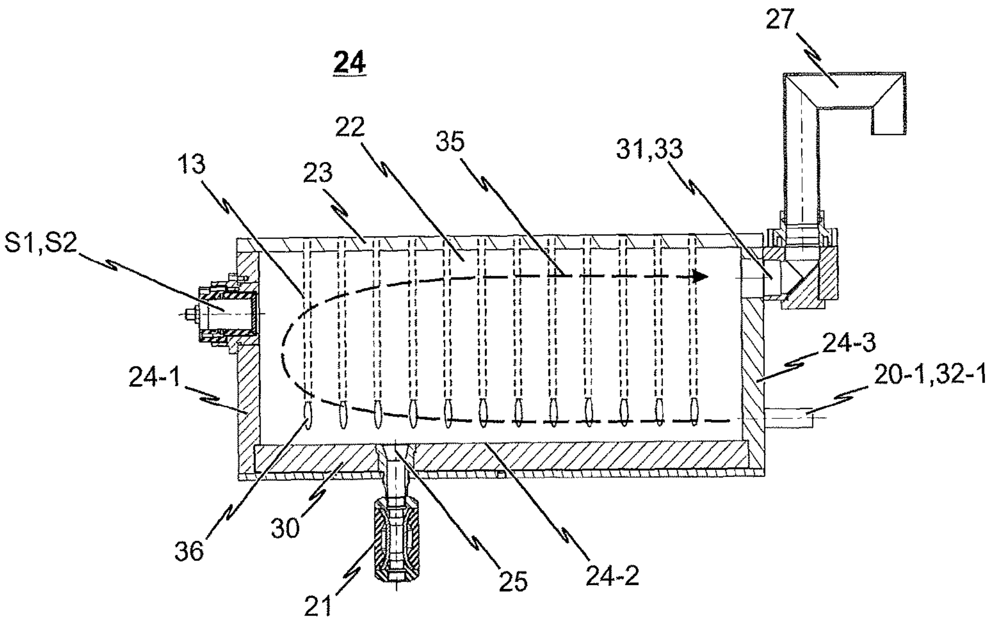
Figure 2B:
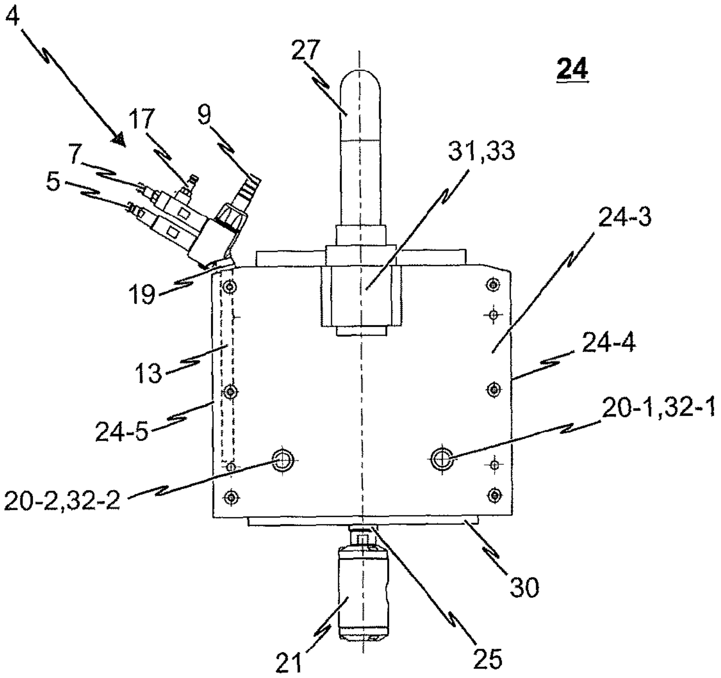
Figure 3:
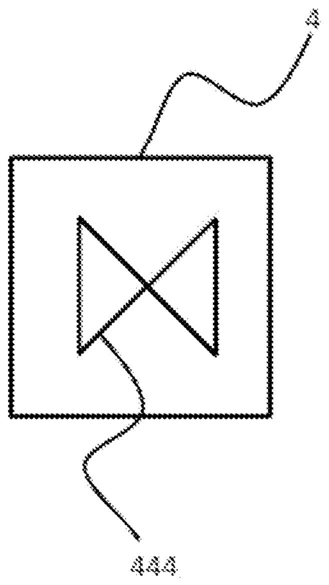

In the drawings:

FIG. 1 shows schematically a powder coating installation with a powder supplying device according to the invention;

FIG. 2*a* shows a side longitudinal section view of a powder container according to one exemplary embodiment of the powder supplying device according to the invention; and FIG. 2*b* shows a view of the end side of the powder container according to FIG. 2*a* with a powder injector which is connected to a powder discharge channel of the powder container; and FIG. 3 shows a functional black box schematic of an injector with a Venturi nozzle.

FIG. 1 shows schematically an exemplary embodiment of a powder coating installation 1 according to the invention for the spray coating of objects 2 with coating powder which is subsequently fused onto the objects 2 in a heating furnace (not illustrated in FIG. 1). One or more electronic control devices 3 are provided for controlling the operation of the powder coating installation 1.

Powder pumps 4 are provided for the pneumatic conveying of the coating powder. These may be powder injectors into which coating powder is sucked from a powder container by means of compressed air serving as conveying compressed air, after which the mixture of conveying compressed air and coating powder then flows together into a container or to a spraying device.

Suitable powder injectors are disclosed, for example, in the document EP 0 412 289 B1.

It is also possible to use as the powder pump 4 those types of pump which convey small powder portions successively by means of compressed air, wherein one small powder portion (powder quantity) is in each case stored in a powder chamber and then pushed out of the powder chamber by means of compressed air. The compressed air remains behind the powder portion and pushes the powder portion ahead thereof. These types of pump are sometimes referred to as compressed-air pushing pumps or as slug conveying pumps, since the compressed air pushes the stored powder portion, such as a slug, ahead thereof through a pump outlet line.

Various types of such powder pumps for conveying compact coating powder are known, for example, from the following documents: DE 103 53 968 A1, U.S. Pat. No. 6,508,610 B2, US 2006/0193704 A1, DE 101 45 448 A1 or WO 2005/051549 A1.

The invention is not restricted to one of the abovementioned types of powder pumps.

In order to produce the compressed air for the pneumatic conveying of the coating powder and for fluidizing the coating powder, there is a compressed-air source 6 which is connected to the various devices via corresponding pressure-setting elements 8, for example pressure regulators and/or valves.

Fresh powder from a powder supplier is fed from a supplier's container, which may be, for example, a small container 12, for example in the form of a dimensionally stable container or a bag with a powder quantity of, for example, between 10 to 50 kg, for example 25 kg, or, for example, a large container 14, for example likewise a dimensionally stable container or a bag, with a powder quantity of between, for example, 100 kg and 1000 kg, by means of a powder pump 4 in a fresh powder line 16 or 18 to a screening device 10. The screening device 10 may be provided with a vibrator 11. In the description below, the terms "small container" and "large container" both mean "dimensionally stable container" and "flexible bag which is not dimensionally stable", except if reference is expressly made to one or the other type of container.

The coating powder screened by the screening device 10 is conveyed by gravitational force, or preferably in each case by a powder pump 4, via one or more powder feed lines 20, 20' through powder inlet openings 26, 26' into a powder chamber 22 of a dimensionally stable powder container 24. The volume of the powder chamber 22 is preferably substantially smaller than the volume of the fresh-powder small container 12.

According to one conceivable realization of the solution according to the invention, the powder pump 4 of the at least one powder feed line 20, 20' to the powder container 24 is a compressed-air pushing pump. In this case, the initial section of the powder feed line 20 can serve as the pump chamber into which powder screened by the screening device 10 drops through a valve, for example a pinch valve. Once said pump chamber contains a certain powder portion, the powder feed line 20 is disconnected in terms of flow from the screening device 10 by closing of the valve. The powder portion is then pushed by means of compressed air through the powder feed line 20, 20' into the powder chamber 22.

Powder pumps 4, for example powder injectors, for conveying coating powder through powder lines 38 to spraying devices 40 are connected to one or preferably to more than one powder outlet opening 36 of the powder container 24. The spraying devices 40 can have spray nozzles or rotary atomizers for spraying the coating powder 42 onto the object 2 which is to be coated and which is preferably located in a coating cubical 43.

The powder outlet openings 36 can be located—as illustrated in FIG. 1—in a wall of the powder container 24, which wall lies opposite the wall in which the powder inlet openings 26, 26' are located. However, in the embodiment of the powder container 24 that is illustrated in FIG. 2*a* and FIG. 2*b*, the powder outlet openings 36 are arranged in a wall which is adjacent to the wall in which the powder inlet openings 26, 26' are located. The powder outlet openings 36 are preferably arranged close to the bottom of the powder chamber 22.

The powder chamber 22 is preferably of a size which lies within the range of a coating powder volumetric capacity of between 1.0 kg and 12.0 kg, preferably between 2.0 kg and 8.0 kg. According to other aspects, the size of the powder chamber 22 is preferably between 500 $cm^3$ and 30,000 $cm^3$, preferably between 2,000 $cm^3$ and 20,000 $cm^3$. The size of the powder chamber 22 is selected depending on the number of powder outlet openings 36 and of the powder lines 38 connected to the latter such that a continuous spray coating operation is possible, but the powder chamber 22 can be rapidly, and preferably automatically, cleaned in coating pauses for a change of powder.

The powder chamber 22 can be provided with a fluidizing device 30 for fluidizing the coating powder accommodated in the powder container 24. The fluidizing device 30 contains at least one fluidizing wall made of a material with open pores or which is provided with narrow pores and is permeable to compressed air but not to coating powder. Although not shown in FIG. 1, it is advantageous if, in the case of the powder container 24, the fluidizing wall forms the bottom of the powder container 24 and is arranged between the powder chamber and a fluidizing compressed-air chamber. The fluidizing compressed-air chamber should be connectable to the compressed-air source 6 via a pressure-setting element 8.

Coating powder 42 which does not adhere to the object 2 to be coated is sucked as excess powder via an excess powder line 44 by means of a suction air stream of a fan 46 into a cyclone separator 48. The excess powder is separated as far as possible from the suction air stream in the cyclone separator 48. The separated powder portion is then conducted as recovery powder from the cyclone separator 48 via a powder recovery line 50 to the screening device 10 where it passes through the screening device 10, either by itself or mixed with fresh powder, via the powder feed lines 20, 20' into the powder chamber 22 again.

Depending on the type of powder and/or degree of powder soiling, the option can also be provided of disconnecting the powder recovery line 50 from the screening device 10 and conducting the recovery powder into a waste container, as illustrated schematically by a dashed line 51 in FIG. 1. The powder recovery line 50, so that it does not need to be disconnected from the screening device 10, may be provided with a diverter 52 at which it can be connected alternatively to the screening device 10 or to a waste container.

The powder container 24 may have one or more than one sensor, for example two sensors S1 and/or S2, in order to control the feeding of coating powder into the powder chamber 22 by means of the control device 3 and the powder pumps 4 in the powder feed lines 20, 20'. For example, the lower sensor S1 detects a lower powder level limit and the upper sensor S2 detects an upper powder level limit.

The lower end portion 48-2 of the cyclone separator 48 can be designed and used as a storage container for recovery powder and, for this purpose, can be provided with one or more than one sensor, for example two sensors S3 and/or S4, which are functionally connected to the control device 3. As a result, the fresh powder feeding through the fresh powder feed lines 16 and 18 can be stopped, for example automatically, if there is sufficient recovery powder in the cyclone separator 48 in order to feed recovery powder to the powder chamber through the screening device 10 in a quantity sufficient for the spray coating operation by means of the spraying devices 40. If there is no longer sufficient recovery powder for this purpose in the cyclone separator 48, a switch can be made automatically to the feeding of fresh powder through the fresh powder feed lines 16 or 18. Furthermore, there is also the option of feeding fresh powder and recovery powder to the screening device 10 simultaneously such that they are mixed with each other.

The outgoing air from the cyclone separator 48 passes via an outgoing-air line 54 into an after-filter device 56 and through one or more filter elements 58 therein to the fan 46 and, downstream of the latter, into the outside atmosphere. The filter elements 58 may be filter bags or filter cartridges or filter plates or similar filter elements. The powder separated from the air stream by means of the filter elements 58 is normally waste powder and drops by means of gravitational force into a waste container or, as shown in FIG. 1, can be conveyed via one or more waste lines 60, which each contain a powder pump 4, into a waste container 62 at a waste station 63.

Depending on the type of powder and powder coating conditions, the waste powder may also be recovered again to the screening device 10 in order to reenter the coating circuit. This is illustrated schematically in FIG. 1 by means of diverters 59 and branch lines 61 of the waste lines 60.

During multi-color operation, in which various colors are each sprayed for only a short period, use is customarily made of the cyclone separator 48 and the after-filter device 56, and the waste powder from the after-filter device 56 passes into the waste container 62. Although the powder-separating efficiency of the cyclone separator 48 is generally lower than that of the after-filter device 56, said cyclone separator can be cleaned more rapidly than the after-filter device 56. During single-color operation, in which the same powder is used for a long period, it is possible to dispense with the cyclone separator 48 and to connect the excess powder line 44 instead of the outgoing-air line 54 to the after-filter device 56, and to connect the waste lines 60, which in this case contain powder which is to be recovered, to the screening device 10 as recovery powder lines.

During the single-color operation, use is then customarily made only of the cyclone separator 48 in combination with the after-filter device 56 if a problematic coating powder is involved. In this case, only the recovery powder from the cyclone separator 48 is fed to the screening device 10 via the powder recovery line 50 while the waste powder from the after-filter device 56 passes as waste into the waste container 62 or into another waste container which can be placed without waste lines 60 directly below an outlet opening of the after-filter device 56.

The lower end of the cyclone separator 48 can have an outlet valve 64, for example a pinch valve. Furthermore, a fluidizing device 66 for fluidizing the coating powder can be provided in the or on the lower end of the lower end portion 48-2 of the cyclone separator 48, which end portion is designed as a storage container, above said outlet valve 64. The fluidizing device 66 contains at least one fluidizing wall 80 made of a material which has open pores or is provided with narrow bores and is permeable to compressed air, but not to coating powder. The fluidizing wall 80 is arranged between the powder path and a fluidizing compressed-air chamber 81. The fluidizing compressed-air chamber 81 can be connected to the compressed-air source 6 via a pressure-setting element 8.

The fresh powder line 16 and/or 18 can be connected in terms of flow at the upstream end thereof, either directly or by the powder pump 4, to a powder conveying tube 70 which can be immersed into the supplier's container 12 or 14 in order to extract fresh coating powder. The powder pump 4 may be arranged at the beginning, at the end or in between in the fresh powder line 16 or 18 or at the upper or lower end of the powder conveying tube 70.

FIG. 1 shows, as the fresh-powder small container, a fresh-powder powder bag 12 in a bag receiving hopper 74. The powder bag 12 is held in a defined shape by the bag receiving hopper 74, with the bag opening being located at the upper end of the bag. The bag receiving hopper 74 may be arranged on a pair of scales or weighing sensors 76. Depending on the type, said pair of scales or the weighing sensors 76 can generate a visual display and/or an electric signal which, after deducting the weight of the bag receiving hopper 74, corresponds to the weight and therefore also to the quantity of coating powder in the small container 12. At least one vibrating vibrator 78 is preferably arranged on the bag receiving hopper 74.

Two or more small containers 12 can be provided in each bag receiving hopper 74 and/or two or more large containers 14, which are alternatively useable, can be provided. This permits rapid changing from one to another small container 12 or large container 14.

Although not illustrated in FIG. 1, it is in principle conceivable for the screening device 10 to be integrated in the powder container 24. Furthermore, the screening device 10 may be omitted if the fresh powder is of a sufficiently good quality. In this case, there is furthermore the option of using a separate screen, for example, upstream or downstream of the cyclone separator 48 or in the cyclone separator 48 itself, to screen the recovery powder of the lines 44 and 55. The recovery powder does not require a screen either if the powder quality thereof is sufficiently good for reuse.

The powder inlet openings 26, 26' are arranged in a side wall of the powder container 24, preferably close to the bottom of the powder chamber 22. In the exemplary embodiment of the powder container 24 illustrated in FIGS. 2*a* and 2*b*, at least one residual powder outlet 33 is furthermore provided in the same side wall of the powder container 24, through which residual powder outlet residual powder can be driven out of the powder chamber 22 during the cleaning operation with the aid of cleaning compressed air introduced into the powder chamber 22.

In order to be able to introduce the cleaning compressed air into the powder chamber 22, during the cleaning operation, the powder container 24 has at least one cleaning compressed-air inlet 32-1, 32-2 in a side wall. During the cleaning operation of the powder coating installation 1, the cleaning compressed-air inlets 32-1, 32-2 are connected in terms of flow to a compressed-air source 6 via cleaning compressed-air feed lines 101-1, 101-2, 101-3 in order to feed cleaning compressed air to the powder chamber 22. Each cleaning compressed-air inlet 32-1, 32-2 preferably has an inlet opening in the side wall of the powder container 24, which inlet opening is identical to a powder inlet opening 26, 26' via which coating powder is fed to the powder chamber 22 as and when required during the powder coating operation of the powder coating installation 1.

The operation of cleaning the powder chamber 22 is described in more detail below with reference to the powder containers 24 illustrated in FIG. 2*a* and FIG. 2*b*.

Furthermore, in the side wall of the powder container 24, in which the inlet openings of the cleaning compressed-air inlets 32-1, 32-2 are provided, there can be at least one outlet opening of a residual powder outlet 33, through which residual powder is driven out of the powder chamber 22 in the cleaning operation of the powder coating installation 1 with the aid of the cleaning compressed air introduced into the powder chamber 22.

As already mentioned, the powder container 24 is equipped with a fluidizing device 30 in order to introduce fluidizing compressed air into the powder chamber 22 at least during the powder coating operation of the powder coating installation 1. Furthermore, the powder container 24 has at least one fluidizing compressed-air outlet 31 with an outlet opening via which the fluidizing compressed air introduced into the powder chamber 22 can be discharged again for the purpose of equalizing the pressure. The outlet opening of the fluidizing compressed-air outlet 31 is preferably identical to the outlet opening of the residual powder outlet 33.

An exemplary embodiment of a powder container 24 of a powder supplying device for a powder coating installation 1 is described in detail below with reference to the illustrations in FIGS. 2*a* and 2*b*.

The powder container 24 shown in FIGS. 2*a* and 2*b* is suitable in particular as part of the powder coating installation 1 described previously with reference to the illustration in FIG. 1.

As illustrated in FIG. 2*a*, the exemplary embodiment involves a powder container 24 which is closed or is closeable by a cover 23, wherein the cover 23 is connectable to the powder container 24 preferably via a rapidly releasable connection.

The powder container 24 illustrated in FIG. 2*a* has a substantially cuboidal powder chamber 22 for receiving coating powder. At least one cleaning compressed-air inlet 32-1, 32-2 to which a compressed air source 6 can be connected in a cleaning operation of the powder coating installation 1 for removing residual powder from the powder chamber 22 via a compressed air line, in order to introduce cleaning compressed air into the powder chamber 22, is provided in a side wall 24-3 of the powder container 24. Furthermore, a residual powder outlet 33 which has an outlet opening, via which residual powder can be driven out of the powder chamber 22 during the cleaning operation of the powder coating installation 1 with the aid of the cleaning compressed air introduced into the powder chamber 22, is provided on the abovementioned side wall 24-3 of the powder container 24.

As can be gathered in particular from the illustration in FIG. 2*b*, in the exemplary embodiment of the powder container 24 a total of two cleaning compressed-air inlets 32-1, 32-2 are provided, wherein each of the two cleaning compressed-air inlets 32-1, 32-2 has an inlet opening. On the other hand, just one residual powder outlet 33 with just one outlet opening is provided, wherein the two inlet openings of the cleaning compressed-air inlets 32-1, 32-2 are spaced apart in the vertical direction from the outlet opening of the residual powder outlet 34.

In detail, and as can be gathered in particular from the illustration in FIG. 2*b*, it is provided in the exemplary embodiment that the outlet opening of the residual powder outlet 33 is provided in an upper region of the side wall 24-3 of the powder container 24 and the two inlet openings of the cleaning compressed-air inlets 32-1, 32-2 are provided in a lower region of the side wall 24-3 of the powder container 24. The effect achieved by said special arrangement of the inlet openings, on the one hand, and of the outlet opening, on the other hand, is that, during the cleaning operation of the powder coating installation 1, first of all the residual powder which may still be adhering to the bottom wall 24-2 of the powder container 24 is swirled up by the cleaning compressed air introduced into the powder chamber 22, and is carried out of the powder chamber 22 with the cleaning compressed air via the outlet opening of the residual powder outlet 33.

Also, an air roll 35, as indicated in FIG. 2*a*, is formed in the powder chamber 22. During the cleaning operation, the residual powder which may still be adhering to the walls 24-1, 24-2, 24-3, 24-4, 24-5 of the powder container 24 and to the cover 23 of the powder container 24 can be detached in an effective manner by said air roll 35 and carried out of the powder chamber 22. Owing to the fact that the outlet opening of the residual powder outlet 33 is arranged in the upper region of that side wall 24-3 of the powder container 24 in which the inlet openings of the two cleaning compressed-air inlets 32-1, 32-2 are also provided, the cleaning compressed air introduced into the powder chamber 22—after having flowed around the side walls 24-1, 24-3, 24-4, 24-5 and the bottom wall 24-2 and the inner wall of the cover of the powder container 24—can be led out of the powder chamber 22 again without a relatively great change in direction. This has the result that at least most of the residual powder transported along with the cleaning compressed air can be discharged from the powder chamber 22 together with the cleaning compressed air.

In the exemplary embodiment illustrated in FIGS. 2*a* and 2*b*, it is provided that the inlet openings of the two cleaning compressed-air inlets 32-1, 32-2 serve in the powder coating operation of the powder coating installation 1 as powder inlet openings to which powder feed lines 20, 20' can be connected outside the powder chamber 22 for feeding coating powder into the powder chamber 22 as and when required. Accordingly, in the embodiment illustrated, each cleaning compressed-air inlet 32-1, 32-2 obtains the function in the powder coating operation of the powder coating installation 1 of a powder inlet 20-1, 20-2 which are connected in terms of flow to the powder feed lines 20, 20' when required. Of course, however, it is also conceivable to provide separate powder inlets 20-1, 20-2 in addition to the cleaning compressed-air inlets 32-1, 32-2.

In the embodiment illustrated in FIGS. 2*a* and 2*b*, it is provided that, in the powder coating operation of the powder coating installation 1, the inlet opening of one of the two powder inlets 20-1, 20-2 serves for feeding fresh powder as and when required and the inlet opening of the other of the two powder inlets 20-2, 20-1 serves for feeding recovery powder as and when required. Of course, however, it is also conceivable that, in the powder coating operation of the powder coating installation 1, both recovery power and fresh powder can be supplied from one and the same powder inlet 20-2, 20-1 via the inlet opening as and when required.

In the embodiment illustrated in FIG. 2*a* and FIG. 2*b*, a fluidizing device 30 is preferably provided for introducing fluidizing compressed air into the powder chamber 22. The fluidizing compressed air can be introduced into the powder chamber 22 through an end wall, side longitudinal wall, bottom wall or top wall. According to the embodiment illustrated, the bottom wall 24-2 of the powder chamber 22 is designed as a fluidizing floor. It has a multiplicity of open pores or small passage openings through which fluidizing compressed air from a fluidizing compressed-air chamber arranged below the bottom wall can flow upward into the powder chamber 22 in order to set (fluidize) the coating powder therein into a suspended state during the powder coating operation of the powder coating installation 1 such that said coating powder can easily be extracted with the aid of a powder discharge device. The fluidizing compressed air is fed to the fluidizing compressed-air chamber through a fluidizing compressed-air inlet.

So that, during operation of the fluidizing device 30, the pressure within the powder chamber 22 does not exceed a maximum pressure defined in advance, the powder chamber 22 has at least one fluidizing compressed-air outlet 31 with an outlet opening for discharging the fluidizing compressed air introduced into the powder chamber 22 and for equalizing the pressure. In particular, the outlet opening of the at least one fluidizing compressed-air outlet 31 should be dimensioned in such a manner that at maximum a positive pressure of 0.5 bar prevails over atmospheric pressure during the operation of the fluidizing device 30 in the powder chamber 22.

In the embodiment illustrated in FIGS. 2*a* and 2*b*, the outlet opening of the residual powder outlet 33 is identical to the outlet opening of the fluidizing compressed-air outlet 31. Of course, however, it is also possible that the fluidizing compressed-air outlet 31 is provided, for example, in the cover 23 of the powder container 24.

As can be gathered in particular in the illustration in FIG. 2*a*, in the embodiment shown, the fluidizing compressed-air outlet 31 has a venting line which is connected or can be connected outside the powder chamber 22 to a rising pipe 27 for preventing a powder emission from the powder chamber 22 during the powder coating operation of the powder coating installation 1.

In order to discharge the fluidizing compressed air introduced into the powder chamber 22, it is furthermore conceivable to provide a venting line which preferably projects into the upper region of the powder chamber 22. The projecting end of the venting line can project into an extraction funnel of an extraction installation. Said extraction installation can be formed, for example, as a booster (air mover). A booster, which is also known as an air mover, operates in accordance with the Coanda effect and, for the operation thereof, requires customary compressed air which has to be fed in a small quantity. Said air quantity has a higher pressure than the ambient pressure. The booster generates an air flow of high velocity, with a large volume and low pressure, in the extraction funnel. A booster is therefore particularly readily suitable in conjunction with the venting line or the fluidizing compressed-air outlet 31.

In the exemplary embodiment illustrated in FIG. 2*a*, the powder container 24 has a contactlessly operating level sensor S1, S2 for detecting the maximum permissible powder level in the powder chamber 22. It is conceivable in this connection to provide a further level sensor which, with regard to the powder container 24, is arranged so as to detect a minimum powder level and, as soon as said minimum powder level is reached or the level drops therebelow, to output a corresponding message to a control device 3 in order, preferably automatically, to feed fresh powder or recovery powder to the powder chamber 22 via the inlet opening of the at least one powder inlet 20-1, 20-2.

The level sensor S1, S2 for detecting the powder level in the powder chamber 22 is preferably a contactlessly operating level sensor and is arranged outside the powder chamber 22 and separated from it. This prevents soiling of the level sensor S1, S2. The level sensor S1, S2 generates a signal when the powder level has reached a certain height. It is also possible for a plurality of such powder level sensors S1, S2 to be arranged at different heights, for example for detecting predetermined maximum levels and for detecting a predetermined minimum level.

The signals of the at least one level sensor S1, S2 are used preferably for controlling an automatic powder feeding of coating powder through the powder inlets 20-1, 20-2 into the powder chamber 22 in order to maintain a predetermined level or a predetermined level region therein even during the period during which the powder injectors 4 extract coating powder out of the powder chamber 22 and to convey said coating powder pneumatically to spraying devices 40 (or into other containers).

During such a powder spray coating operation, cleaning compressed air is only conducted into the powder chamber 22 at reduced pressure, if at all.

For cleaning the powder chamber 22 in coating pauses, for example during the change from one type of powder to another type of powder, cleaning compressed air is fed to the powder chamber 22 through the at least one cleaning compressed-air inlet 32-1, 32-2. The cleaning compressed air generates an air roll 35 in the interior of the powder container 24, said air roll detaching residual powder which may be adhering to the inner wall of the powder container 24 and driving said residual powder out of the powder chamber 22 through the residual powder outlet 34.

Although not explicitly illustrated in the drawings, it is furthermore conceivable to provide a device for measuring the air pressure prevailing in the powder chamber 22. This is important in so far as care should be taken to ensure that an excessive positive pressure cannot be built up in the interior of the powder container 24 by the introduction of fluidizing compressed air during the powder coating operation of the powder coating installation 1 and by introduction of cleaning compressed air in the cleaning operation of the powder coating installation 1, since the powder container 24 is generally not designed as a high pressure container. In this respect, it is preferred if the maximum permissible positive pressure in the powder chamber 22 does not exceed the value of 0.5 bar.

In the embodiment last mentioned, it is conceivable in particular for the air pressure measured in the powder chamber 22 to be fed continuously or at predetermined times or events to a control device 3, wherein the amount of fluidizing compressed air fed to the powder chamber 22 per unit of time, and/or the amount of fluidizing compressed air discharged from the powder chamber 22 per unit of time via the at least one fluidizing compressed-air outlet 31 are/is adjusted, preferably automatically, in dependence on the air pressure prevailing in the powder chamber 22. By contrast, during the cleaning operation of the powder coating installation 1, it is preferred if, with the aid of the control device 3, the amount of cleaning compressed air fed to the powder chamber 22 per unit of time and/or the amount of cleaning compressed air discharged per unit of time via the at least one residual powder outlet 33 are/is adjusted, preferably automatically, in dependence on the air pressure prevailing in the powder chamber 22.

As can be gathered from the illustration in FIG. 2*a*, it is provided in the exemplary embodiment that a powder outlet 25, which can be opened with the aid of a pinch valve 21 in order to remove coating powder from the powder chamber 22 as and when required, preferably by gravitational force, is provided in the bottom wall 24-2 of the powder container 24. This is required in particular whenever coating powder of the old type is still present in the powder chamber 22 when there is a change of color or powder.

The powder chamber 22 particularly preferably has an angular inner configuration, in which the base area and the side faces of the powder chamber 22 are connected to one another via edges, in particular right-angled edges. It is ensured by said angular inner configuration of the powder chamber 22 that, during the cleaning operation of the powder coating installation 1, the air roll 35 forming in the interior of the powder chamber 22 builds up a turbulent boundary layer rather than a laminar boundary layer, which facilitates the removal of residual powder adhering to the inner wall of the powder container 24.

In order to be able to form as ideal an air roll 35 as possible in the interior of the powder container 24 during the cleaning operation of the powder coating installation 1, it has been shown in practice that it is preferred if the powder chamber 22 has a height of 180 mm to 260 mm, preferably of 200 mm to 240 mm, and more preferably of 220 mm, the powder chamber 22 having a width of 140 mm to 220 mm, preferably of 160 mm to 200 mm, and more preferably of 180 mm, and the powder chamber 22 having a length of 510 mm to 590 mm, preferably of 530 mm to 570 mm, and more preferably of 550 mm. Given said stated dimensions of the powder chamber 22, the at least one cleaning compressed-air inlet 32-1, 32-2 and the at least one residual powder outlet 33 should furthermore be provided in a common end wall 24-3 of the powder container 24.

The powder supplying device shown in FIG. 2*a* and FIG. 2*b* furthermore has at least one powder discharge device in order to be able to convey coating powder by means of one, preferably more than one, powder injector 4 via powder hoses 38 to spraying devices 40 and to be able to spray said coating powder by means of said spraying devices onto an object 2 to be coated.

As illustrated in FIG. 2*a*, corresponding powder discharge openings 36 are provided in the chamber walls 24-3 and 24-4 of the powder container 24. In the embodiment illustrated, it is provided that each of the powder discharge openings 36 is connected in terms of flow to an associated powder injector 4 in order to be able to suck coating powder out of the powder chamber 22 during the powder coating operation of the powder coating installation 1 and to be able to feed said coating powder to the spraying devices 40. The powder discharge openings 36 preferably have an elliptical shape such that the effective region for sucking up fluidized coating powder is increased.

The powder discharge openings 36 are arranged as low as possible in the powder chamber 22 in order to be able to extract as far as possible all of the coating powder out of the powder chamber 22 by means of the powder injectors 4. The powder injectors 4 are preferably located at a location positioned higher than the highest powder level and are each connected via a powder discharge channel 13 (illustrated by dashed lines in FIGS. 2*a* and 2*b*) to one of the powder discharge openings 36. Owing to the fact that the powder injectors 4 are arranged higher than the maximum powder level, it is avoided that the coating powder rises up out of the powder chamber 22 into the powder injectors 4 if the powder injectors 4 are not switched on.

The powder discharge channel 13 may be formed, for example, in a dip pipe protruding into the powder chamber 22, or—as provided in the embodiment according to FIGS. 2*a* and 2*b*—in a side wall 24-4, 24-5 of the powder container 24. Irrespective of how the powder discharge channel 13 is actually realized, it is preferred if the powder discharge channel 13 has a diameter of at most 10 mm and at least 3 mm, and preferably a diameter of 8 mm to 5 mm. The powder discharge channel 13 therefore has a diameter which is reduced in comparison to solutions known from the prior art.

As illustrated in FIG. 2*b*, each powder injector 4 has a conveying compressed-air connection 5, which can be connected to a compressed air source, for the regulated feeding of conveying compressed air which generates a negative pressure in a negative pressure region of the injector 4 and, as a result, sucks coating powder out of the powder chamber 22 via the powder discharge channel 13 and then conveys said coating powder through a powder output (receiving nozzle 9) by a powder hose 38 to a receiving point, which may be the abovementioned spraying device 40 or a further powder container 24. In order to support the powder conveying, the powder injector 4 can be provided with an additional compressed-air or metering-air input 7 for feeding additional compressed air into the conveying compressed-air powder stream at the powder output 9.

Although not illustrated for reasons of clarity, in the embodiment illustrated in FIG. 2*a* and FIG. 2*b*, a multiplicity of powder injectors 4 are used, the powder discharge channels 13 of the multiplicity of powder injectors being formed within two opposite side walls 24-4, 24-5 of the powder container 24. Of course, however, it is also conceivable for the powder discharge channels 13 not to be formed in side walls of the powder container 24 but rather to be formed as powder suction tubes.

As can be gathered from the illustration in FIG. 2*b*, in this exemplary embodiment the at least one powder injector 4 has a conveying compressed-air connection 5, which is connected or can be connected to a compressed air source, for the regulated feeding of conveying compressed air, and a metering compressed-air connection 7, which likewise is connected or can be connected to a compressed air source 6, for the regulated feeding of metering compressed air, the conveying compressed air fed to the powder injector 4 generating a negative pressure in a negative pressure region of the powder injector 4 in such a way that coating powder can be sucked out of the powder chamber 22 via the powder discharge channel 13 assigned to the powder injector 4, and the metering compressed-air connection 7 being provided downstream of the negative pressure region of the powder injector 4.

Although not gatherable from the illustration in FIG. 2*b*, the at least one powder injector 4 also preferably has a Venturi nozzle, which is arranged and formed in such a way that the conveying compressed air fed via the conveying compressed-air connection 5 of the powder injector 4 flows through the Venturi nozzle, so that a dynamic pressure drop is created in the region of the narrowed cross section of the Venturi nozzle to form the negative pressure region.

In the embodiment illustrated in FIG. 2*b*, the at least one powder injector 4 has an exchangeable receiving nozzle 9, which is arranged and formed downstream of the negative pressure region of the powder injector 4 in order to form a powder outlet, and is connected or can be connected to a powder line 38, in particular to a powder hose, to convey the coating powder sucked out of the powder chamber 22 with the aid of the powder injector 4 to a spraying device 40.

In the special embodiment illustrated in FIG. 2*b*, the at least one powder injector 4 also has a cleaning compressed-air connection 17, which is connected or can be connected to a compressed air source, for the regulated feeding of cleaning compressed air in the cleaning operation of the powder coating installation, the cleaning compressed-air connection 5 being provided downstream of the negative pressure region of the powder injector 4.

As illustrated in FIG. 2*b*, the cleaning compressed-air connection 17 can be connected to the metering compressed-air connection 7 via a branch, in particular a T piece, although, of course, other realizations are also conceivable.

In particular, it is preferred if a manually actuable or automatically operating pressure regulating device is provided to regulate the amount of conveying compressed air fed to the conveying compressed-air connection 5 per unit of time in the cleaning operation of the powder coating installation. The pressure regulating device should preferably be designed to regulate the amount of cleaning compressed air fed to the cleaning compressed-air connection 17 per unit of time in the cleaning operation of the powder coating installation.

As an alternative or in addition thereto, it is preferred if the pressure regulating device is designed to regulate the amount of metering compressed air fed to the metering compressed-air connection 7 per unit of time in the cleaning operation of the powder coating installation. In particular, the pressure regulating device here can be designed to set the amount of conveying compressed air fed to the conveying compressed-air connection 5 per unit of time and/or the amount of cleaning compressed air fed to the cleaning compressed-air connection 17 per unit of time and/or the amount of metering compressed air fed to the metering compressed-air connection 7 per unit of time in the cleaning operation of the powder coating installation, in particular when there is a change of color or powder, in such a way that at least 20%, and preferably between 25% and 50%, of the compressed air fed in total per unit of time to the at least one powder injector 4 flows as purging air through the powder discharge channel 13 into the powder chamber 22, and that the rest of the compressed air fed in total per unit of time to the at least one powder injector 4 flows as purging air through the powder line 38 to the spraying device 40.

In particular, the pressure regulating device here can be designed such that the amount of compressed air fed in total to the powder injector 4 in the cleaning operation of the powder coating installation is fed to the powder injector 4 with a volume flow rate of at least 10 $m^3/h$ to 17 $m^3/h$, the pressure regulating device preferably also being designed to set the amount of conveying compressed air fed per unit of time to the conveying compressed-air connection 5 and/or the amount of cleaning compressed air fed per unit of time to the cleaning compressed-air connection 17 and/or the amount of metering compressed air fed per unit of time to the metering compressed-air connection 7 in the cleaning operation of the powder coating installation in such a way that compressed air flows through the powder discharge channel 13 with a volume flow rate of at least 3 $m^3/h$, and that compressed air flows through the powder line 38 with a volume flow rate of at least 9 $m^3/h$.

In order to remove residual powder from the at least one powder injector 4 and from the associated powder discharge channel 13 and the associated powder discharge opening 36, and in order to remove residual powder from a powder line 38 (not explicitly illustrated in FIG. 2*a* and FIG. 2*b*), which is connected in terms of flow to the powder outlet 9 of the powder injector 4, the conveying compressed-air connection 5 of the at least one powder injector 4 can be connected to a compressed air source in order to feed compressed air to the powder injector 4 via the conveying compressed-air connection 5. Since, in comparison to approaches known from the prior art, in the exemplary embodiment the powder discharge channel 13 which is assigned to the powder injector 4 is designed to be shortened, the amount of compressed air fed to the at least one powder injector 4 per unit of time in the cleaning operation of the powder coating installation is divided in the powder injector 4, wherein a partial stream flows through the powder discharge channel 13 into the powder chamber 22 and the other partial stream flows through the receiving nozzle 9 of the powder injector 4, the powder line 38 which is connected thereto and, for example, a spraying device 40, which is connected to the powder line 38. The two partial streams of the compressed air fed in total to the powder injector 4 serve as purging air and clean the corresponding components of the powder supplying device.

In this case, it is preferred for the length and the effective diameter of the powder discharge channel 13 to be matched with regard to the length and the effective diameter of the powder line 38 in such a manner that at least 20%, and preferably between 25% and 50%, of the conveying air fed per unit of time to the at least one powder injector 4 via the conveying compressed-air connection 5 in the cleaning operation flows as purging air through the powder discharge channel 13. In particular, a volume flow rate of 3 $m^3$/h to 4 $m^3$/h is preferred in order to permit effective cleaning of the powder discharge channel 13.

In principle, it is conceivable for the conveying compressed-air connection 5 of the at least one powder injector 4 to be able to be connected in the cleaning operation of the powder coating installation to a cleaning compressed-air source which feeds compressed air to the powder injector 4 with a volume flow rate of at least 10 $m^3$/h to 15 $m^3$/h.

If—as provided in the embodiment illustrated in FIGS. 2*a* and 2*b*—a multiplicity of powder injectors 4 are provided per powder container 24, it is preferred if the multiplicity of powder injectors 4 are activable individually or in groups with the aid of the control device 3, at least in the cleaning operation of the powder coating installation, in such a way that compressed air is optionally fed to the individual conveying compressed-air connections 5 of the powder injectors 4, preferably with a volume flow rate of 10 $m^3$/h to 15 $m^3$/h.

Finally, it is preferred if the powder chamber 22 is provided with a removable cover 23, wherein said cover 23 can be connected to the powder chamber 22 with the aid of a rapidly releasable connection in order to permit rapid access to the powder chamber 22, this being required, for example, should manual recleaning with the aid of, for example, a compressed air gun, be required. The rapidly releasable connection between the cover and the powder chamber 22 may be, for example, a mechanical, magnetic, pneumatic or hydraulic connection.

FIG. 3 presents an exemplary powder injector 4 in functional black box format also having a Venturi nozzle 444.

The invention is not restricted to the previously described exemplary embodiments but rather follows from an overall view of all of the features disclosed herein.

The invention claimed is:

1. Powder supplying device for a powder coating installation with at least one powder container, which has a powder chamber for coating powder, and with at least one powder injector, which is configured for connection to a powder discharge channel opening out via a powder discharge opening in the powder chamber, in order to suck coating powder out of the powder chamber in the powder coating operation of the powder coating installation with the aid of conveying compressed air fed by the powder injector, the powder discharge channel having a reduced length of at most 300 mm such that a total conveying air required as a whole in a powder coating operation utilizing the powder supplying device is less than that which would otherwise be the case with a longer powder discharge channel, all other things being equal.

2. Powder supplying device according to claim 1, the at least one powder injector having an intake pipe connector, which is connected or can be connected to the powder discharge channel, and the powder discharge channel being formed in a dip pipe protruding into the powder chamber.

3. Powder supplying device for a powder coating installation with at least one powder container, which has a powder chamber for coating powder, and with at least one powder injector, which is connected or can be connected to a powder discharge channel opening out via a powder discharge opening in the powder chamber, in order to suck coating powder out of the powder chamber in the powder coating operation of the powder coating installation with the aid of conveying compressed air fed by the powder injector, the powder discharge channel having a reduced length of at most 300 mm, wherein the at least one powder injector having an intake pipe connector, which is connected or can be connected to the powder discharge channel, and the powder discharge channel being formed in a side wall of the powder container.

4. Powder supplying device according to claim 1, the powder discharge opening, via which the powder discharge channel is connected to the powder chamber, having an elliptical form.

5. Powder supplying device according to claim 1, the at least one powder injector being arranged in relation to the powder chamber at a location which is higher than the highest powder level that can be set in the powder chamber.

6. Powder supplying device according to claim 1, the powder chamber having a height of at least one of 180 mm to 260 mm, 200 mm to 240 mm, or 220 mm.

7. Powder supplying device according to claim 1, the powder discharge channel having a diameter of at least one of (i) at most 10 mm and at least 3 mm, or (ii) 8 mm to 5 mm.

8. Powder supplying device according to claim 1, a multiplicity of powder injectors being provided, the powder discharge channels of the multiplicity of powder injectors being formed in two opposite side walls of the powder chamber.

9. Powder supplying device according to claim 1, the at least one powder injector having the following:

a conveying compressed-air connection, which is connected or can be connected to a compressed air source, for the regulated feeding of conveying compressed air; and a metering compressed-air connection, which is connected or can be connected to a compressed air source, for the regulated feeding of metering compressed air, the conveying compressed air fed to the powder injector generating a negative pressure in a negative pressure region of the powder injector in such a way that coating powder can be sucked out of the powder chamber via the powder discharge channel assigned to the powder injector, and the metering compressed-air connection being provided downstream of the negative pressure region of the powder injector.

10. Powder supplying device according to claim 9, the at least one powder injector also having a Venturi nozzle, which is arranged and formed in such a way that the conveying compressed air fed via the conveying compressed-air connection of the powder injector flows through the Venturi nozzle, so that a dynamic pressure drop is created in the region of the narrowest cross section of the Venturi nozzle to form the negative pressure region.

11. Powder supplying device according to claim 9, the at least one powder injector also having a exchangeable receiving nozzle, which is arranged and formed downstream of the negative pressure region of the powder injector to form a powder outlet, is connected or can be connected to a powder line, corresponding to a powder hose, to convey the coating powder sucked out of the powder chamber with the aid of the powder injector to a spraying device.

12. Powder supplying device according to claim 9, the at least one powder injector also having the following:

a cleaning compressed-air connection, which is connected or can be connected to a compressed air source, for the regulated feeding of cleaning compressed air in the cleaning operation of the powder coating installation, the cleaning compressed-air connection being provided downstream of the negative pressure region of the powder injector.

13. Powder supplying device according to claim 12, the cleaning compressed-air connection being connected to the metering compressed-air connection via a branch in the form of a T piece.

14. Powder supplying device according to claim 12, a manually actuable or automatically operating pressure regulating device also being provided to regulate the amount of conveying compressed air fed to the conveying compressed-air connection per unit of time in the cleaning operation of the powder coating installation.

15. Powder supplying device according to claim 14, the pressure regulating device also being designed to regulate the amount of cleaning compressed air fed to the cleaning compressed-air connection per unit of time in the cleaning operation of the powder coating installation.

16. Powder supplying device according to claim 14, the pressure regulating device also being designed to regulate the amount of metering compressed air fed to the metering compressed-air connection per unit of time in the cleaning operation of the powder coating installation.

17. Powder supplying device according to claim 16, the pressure regulating device being designed to set the amount of conveying compressed air fed to the conveying compressed-air connection per unit of time and/or the amount of cleaning compressed air fed to the cleaning compressed-air connection per unit of time and/or the amount of metering compressed air fed to the metering compressed-air connection per unit of time in the cleaning operation of the powder coating installation, when there is a change of color or powder, in such a way that at least 20%, of the compressed air fed in total per unit of time to the at least one powder injector flows as purging air through the powder discharge channel into the powder chamber, and that the rest of the compressed air fed in total per unit of time to the at least one powder injector flows as purging air through the powder line to the spraying device.

18. Powder supplying device according to claim 17, the pressure regulating device being designed such that the amount of compressed air fed in total to the powder injector in the cleaning operation of the powder coating installation, when there is a change of color or powder, is fed to the powder injector with a volume flow rate of at least 10 $m^3$/h to 17 $m^3$/h, and the pressure regulating device also being designed to set the amount of conveying compressed air fed per unit of time to the conveying compressed-air connection and/or the amount of cleaning compressed air fed per unit of time to the cleaning compressed-air connection and/or the amount of metering compressed air fed per unit of time to the metering compressed-air connection in the cleaning operation of the powder coating installation in such a way that compressed air flows through the powder discharge with a volume flow rate of at least 3 $m^3$/h, and that compressed air flows through the powder line with a volume flow rate of at least 9 $m^3$/h.

19. Powder supplying device according to claim 17, a multiplicity of powder injectors being provided, and the multiplicity of powder injectors being activatable individually or in groups with the aid of the pressure regulating device, at least in the cleaning operation of the powder coating installation.

20. Powder supplying device according to claim 1, wherein the powder chamber is cuboidal, wherein the powder discharge channel has a reduced length of 160 mm to 240 mm.

21. Powder supplying device according to claim 20, wherein the powder chamber is cuboidal, wherein the powder discharge channel has a reduced length of 200 mm.

22. Powder supplying device according to claim 1, further including a dip pipe that protrudes into the powder chamber or is provided in a side wall of the powder container.

23. Powder supplying device according to claim 1, further including a device configured to provide suction.

24. Powder supplying device according to claim 1, further including a fan configured to provide a suction air stream.

25. Powder supplying device according to claim 1, wherein the powder discharge channel is formed in a dip pipe.

26. A powder supplying device configured for powder coating of objects, comprising:

at least one powder container including a powder chamber for coating powder;

a powder discharge channel opening out via a powder discharge opening in the powder chamber; and at least one powder injector, which is configured to be placed into fluid communication with the powder discharge channel, wherein the powder supplying device is configured to, during coating of the objects, suck coating powder out of the powder container using conveying compressed air fed by the powder injector, the powder discharge channel having a length of at most 300 mm.

27. The Powder supplying device according to claim 26, wherein the at least one powder injector includes an intake pipe connector, which is connected or can be connected to the powder discharge channel, and the powder discharge channel is formed in a side wall of the powder container.

28. Powder supplying device according to claim 16, the pressure regulating device being designed to set the amount of conveying compressed air fed to the conveying compressed-air connection per unit of time and/or the amount of cleaning compressed air fed to the cleaning compressed-air connection per unit of time and/or the amount of metering compressed air fed to the metering compressed-air connection per unit of time in the cleaning operation of the powder coating installation, when there is a change of color or powder, in such a way that between 25% and 50% of the compressed air fed in total per unit of time to the at least one powder injector flows as purging air through the powder discharge channel into the powder chamber, and that the rest of the compressed air fed in total per unit of time to the at least one powder injector flows as purging air through the powder line to the spraying device.

29. The Powder supplying device according to claim 26, wherein the length of the powder discharge channel is such that a total conveying air required as a whole in a powder coating operation utilizing the powder supplying device is less than that which would otherwise be the case with a longer powder discharge channel, all other things being equal.

* * * * *